United States Patent [19]

Walton

[11] 3,724,814
[45] Apr. 3, 1973

[54] ASSEMBLY OF A PALLET TOWING BRIDLE AND METHOD OF USE
[75] Inventor: Roger H. Walton, Dayton, Ohio
[73] Assignee: The United States of America as represented by the Secretary of the Air Force
[22] Filed: Dec. 1, 1971
[21] Appl. No.: 203,693

[52] U.S. Cl. ................................................254/133
[51] Int. Cl. ................................................B66f 3/00
[58] Field of Search .......... 254/1, 131, 133; 214/516; 294/86, 86 R, 86 A, 86 LS, 86 CG

[56] References Cited

UNITED STATES PATENTS 3,452,963   7/1969   Holst et al. ..........................254/131
3,512,755   5/1970   Donakowski ......................254/131 X
3,664,533   5/1972   Hand ..................................214/516

Primary Examiner—Othell M. Simpson
Attorney—Harry A. Herbert

[57] ABSTRACT

An aircraft cargo pallet-towing bridle in which a framework assembly, incorporating a front body portion, a rear nose portion and an elongated tube rigidly interconnected therebetween, pivotally mounts a rear pawl member and a front latch member each independently movable between retracted and extended positions in respective locking engagement with oppositely-disposed side lip portions on the pellet to be towed.

10 Claims, 7 Drawing Figures

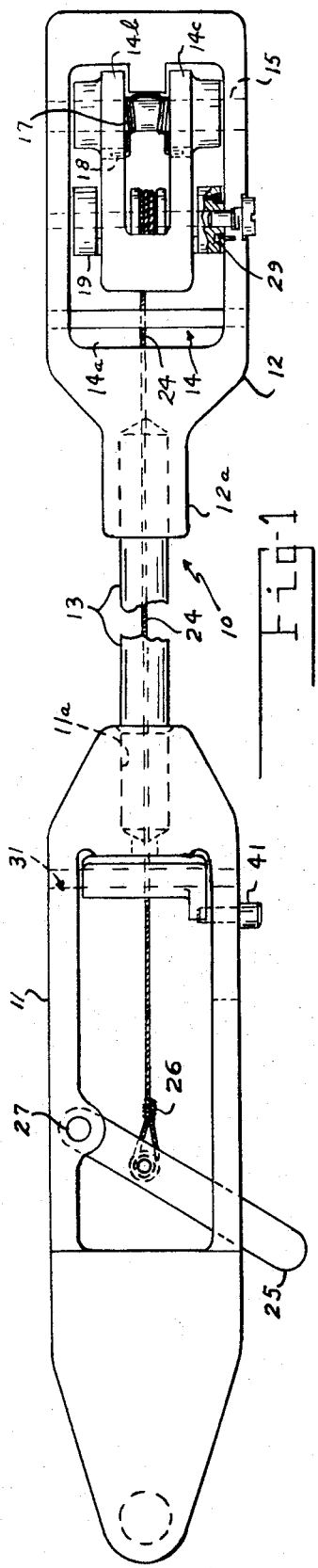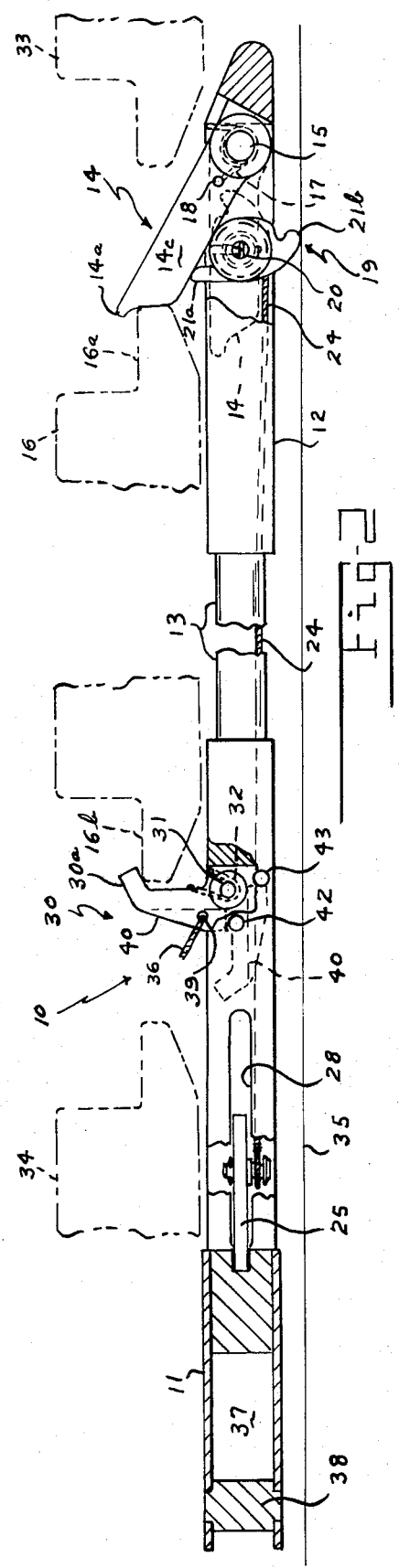

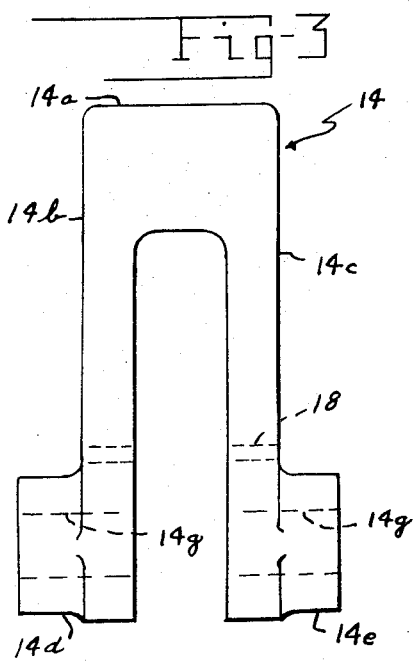
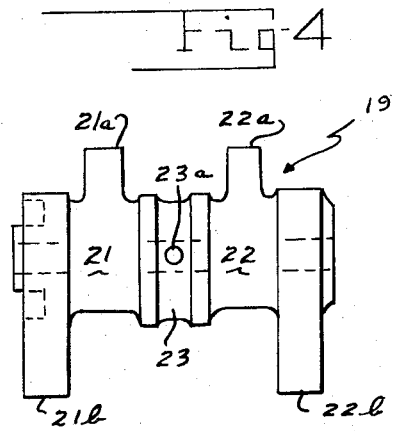
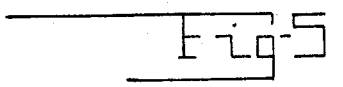
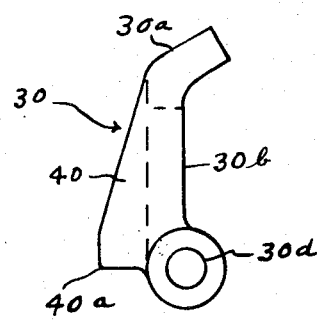
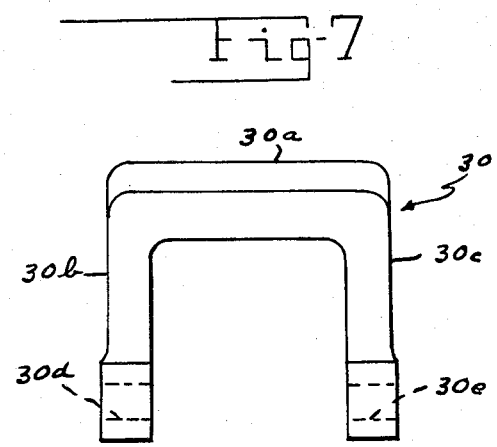

ASSEMBLY OF A PALLET TOWING BRIDLE AND METHOD OF USE

BACKGROUND OF THE INVENTION

This invention relates generally to the loading of multiple palletized loads in an aircraft-cargo compartment.

In placing a series of palletized loads in the cargo compartment of a selected aircraft, one problem of considerable consequence has involved continual efforts to tow successive cargo-carrying pallets to the desired location, with adjacently positioned pallets at a predetermined interval of 2 inches so as to ensure that the available space is fully loaded. Naturally, it is also essential that the method of loading be quick and without damage to either aircraft, load and/or pallet. In this connection, a current technique consists of a bridle in which a chain or cable is attached directly to a pair of outboard rings usually found on the side of the pallet to be towed. The hook on the end of the towing cable of the aircraft-winch mechanism is then connected to the center of the bridle-cable or chain and the mechanism is thereafter actuated to tow the attached pallet into position in the cargo compartment; unfortunately, however, with the foregoing arrangement, it is practically impossible to achieve the aforementioned desirable 2 inch interval between adjacent pallets, since a triangular configuration is formed with the cable hook of the winch mechanism at the apex and the pair of outboard rings at the base. Thus, the pallets cannot be towed any closer to the forward position than is permitted by the altitude of the above-described bridle-triangular configuration. Furthermore, if this problem is attempted to be solved by the use of a closer coupling, or, in other words, by shortening the altitude of the triangle, the load on the outboard rings becomes unacceptably high.

In addition to the above-outlined problems of the bridle-triangular configuration, when succeeding pallets are being loaded behind other pallets already on board, an additional problem results from the winch cable, which must be positioned beneath the already-loaded pallets, contacting and actually having a "sawing" action against the underside of the already-on board pallet or pallets. This sawing action, of course, occurs as the succeeding pallet being loaded begins to arrive at a position in relatively close proximity to the previously loaded pallet. Finally, the requisite 2 inch interval between pallets cannot be accomplished with the foregoing triangle configuration, sinch sufficient space would not then be available to disengage the winch-cable hook from the bridle-chain or cable. Of course, an alternative would be to attach the winch cable-hook directly to one of the pallet's tie down rings, without using a bridle at all; however, the latter system would suffer basically from the same defects hereinbefore discussed and, in addition, in the standard pallet the said tie down ring is 10 inches off center and thus the obviously desirable straight pull by the winch mechanism is made impossible. To solve or at least substantially alleviate the above-discussed difficulties of present pallet towing techniques, the new and improved bridle of the present invention, to be explained hereinafter in the following summary and detailed description thereof, has been developed.

SUMMARY OF THE INVENTION

The present invention constitutes an aircraft cargo load-carrying, pallet towing-bridle consisting briefly of a forward or front body portion, a rear nose portion and an elongated tube rigidly extending therebetween. A pawl member of a finger-like configuration is pivotally supported in the rear nose portion for movement between a retracted and an extended position in locking engagement with one side of the pallet to be towed. A latch member, independently operable from the pawl member, is mounted in the forward body portion and is manually operable for pivotal movement between a retracted position and an extended position in locking engagement with the other side of the pallet. The aforesaid rear, pawl member is spring pressed to a normally retracted position, and a spring-pressed, cam device, in engagement therewith, is manually operable against the action of its spring to urge the said pawl member into its extended, pallet-engaging position.

Inherent additional advantages and objects of the present invention will become readily apparent from the following disclosure thereof, taken in connection with the accompanying drawings, in which;

BRIEF DESCRIPTION OF THE DRAWINGS

FIG. 1 is a top view, partly broken-away, of the overall assembly of the improved bridle of the present invention;

FIG. 2 is a side elevational view, partly in section and broken-away, illustrating additional details of the bridle assembly of FIG. 1;

FIG. 3 is a top view, in partly schematic form, of the unique rear pawl member used with the overall assembly of FIG. 1;

FIGS. 4 and 5 respectively represent front and side views, illustrating further details of the novel cam member used as part of, and to control the operation of unique pawl member of FIG. 3, for example, which forms an integral part of the present invention; and FIGS. 6 and 7 respectively represent side and front views, showing additional details of the forward latch member portion of the invention.

DESCRIPTION OF THE PREFERRED EMBODIMENT

Referring generally to the drawings and, in particular, to FIGS. 1 and 2 thereof, the new and improved cargo pallet-towing bridle mechanism of the present invention is indicated generally at 10 as constituting a frame-type assembly that includes a first, forward, or front, substantially rectangular and open-framework body element at 11, a second, rear, substantially rectangular and open-framework hose element at 12, and a hollow tubular element, shown partly broken-away at 13 as being intermediately-disposed between and rigidly interconnected to, the body and nose elements 11 and 12. For the latter purpose, the opposite end portions of said tubular element 13, which may be actually of a relatively elongated configuration for a specific size pallet to be towed, may be respectively affixed in a snug-fit relation within suitably drilled openings formed in the inwardly-facing end portions of said body and nose elements 11 and 12, as is respectively indicated at 11a and 12a. Said tubular element 13 may, if desired, also be equipped with a standard-type of hinge or other joint means (not shown) for the purpose of folding into a compact unit when not in use. The body element 11 may incorporate, in its front end portion, a side-facing opening, indicated generally at the reference numeral 37 and an upright pillar or vertically-disposed support member at 38 disposed on the forward side of said opening 37 for the purpose of receiving and releasably attaching the aircraft winch mechanism-towing cable hook element (not shown) to the inventive bridle mechanism when it is desired to tow a cargo pallet, as at 16 in FIG. 2, into position in the aircraft-cargo compartment, the flooring of which being indicated generally and schematically at 35.

Uniquely incorporated for pivotal movement between a lowered, retracted position (shown in phantom in FIG. 2) within the open-framework of, and in flush relation to, the top surface of the nose element 12, and an upper, extended position (shown in solid lines) is the novel, substantially finger-shaped pawl member of the invention, which is indicated generally at the reference numeral 14. To specifically provide for the aforementioned pivotal movement, said pawl member 14, which forms one of the key features of the present invention and has the important function to be hereinafter described, is mounted in fixed relation on a supporting shaft, indicated at 15 in the aforementioned FIGS. 1 and 2, which shaft 15 is designed to extend in a transverse relation through appropriate openings formed in the said pawl member 14, which openings are indicated at the reference numerals, clearly indicated at 14f and 14g in a more detailed showing of the said pawl member 14 found in FIG. 3. As seen in the latter figure, pawl member 14 is formed into a substantially U-shaped configuration having a base portion at 14a and a pair of relatively elongated, identical, parallel and spaced-apart projecting arm portions at 14b and 14c. The latter each terminate in a relatively enlarged end portion, indicated respectively at 14d and 14e, and it is in the latter portions that the previously-noted shaft-receiving openings 14f and 14g are located. Moreover, the said base portion 14a actually constitutes the previously-described finger-shape of the pawl member 14 when the latter is seen, for example, in the side elevational view of FIG. 2.

The foregoing pawl member 14, which actually constitutes the rear-pallet-engaging portion of the present bridle mechanism, may be normally retained in its lowered, retracted position by means of a double torsion spring, indicated at 17 in the aforesaid FIGS. 1 and 2. For this purpose, torsion spring 17 is mounted around the shaft 15 and its opposite ends engage in openings, at 18 (Note particularly FIG. 3), formed in the previously-noted projecting arm portions 14b, 14c of the said pawl member 14. When it is desired to reposition the pawl member 14 to its extended position (shown in solid lines in FIG. 2) for the purpose of engaging with the trailing lip portion, indicated at 16a in FIG. 1, of the cargo pallet 16 to be towed into the aircraft-cargo compartment, another unique mechanism, forming an integral part of the present invention, is utilized; namely, the cam mechanism indicated generally at the reference numeral 19 in the aforementioned FIG. 2, for example. As is depicted more clearly in the views of FIGS. 4 and 5, the said cam mechanism 19, which is mounted to the side walls of the nose element 12 for pivotal movement between, a retracted position in flush relation to the top surface of, and therefore within the open-framework thereof by means of a rotatable shaft at 20 (FIG. 1 and 2), actually consists of a double cam arrangement, or, in other words, of an identical pair of cam members, indicated generally and respectively at 21 and 22. Said cam members 21, 22 are held in an integral, spaced-apart relation to each other by means of an intermediately-positioned, integral and rigid interconnecting, central spool-like cam portion at 23 that is disposed therebetween. As in the case of the pawl member 14, the cam mechanism 19 is also normally held in retracted position by a torsion spring, indicated at 29 in FIG. 1.

Each of the aforesaid identical pair of cam members 21 and 22, which are formed into a predetermined spaced-apart relation to each other to thereby ensure their respective precise engagement with the underside of each of the projecting arm portions 14b and 14c of the said pawl member 14, incorporates a pair of oppositely-disposed projecting cam portions, indicated respectively at 21a and 21b, and at 22a and 22b (Note particularly FIGS. 4 and 5). As will be further explained hereinafter, the cam portions 21b and 22b actually constitute and are more particularly referred to as being spring-loaded, operating arms for the pawl member 14. Thus, when the cam mechanism 19 is actuated between its retracted (shown in phantom) and extended positions, pawl member 14 is raised to its elevated or pallet-engaging position with its finger-shaped portion 14a in locking relation with a trailing lip portion 16a formed on the pallet 16 to be towed. This operation will be further described hereinafter in more detail. To provide for this actuation of the cam mechanism 19, an operating cable therefor, indicated at 24, is utilized. One end of the cable 24 is attached within an opening, seen at 23a in FIG. 4, of the cam mechanism-spool-like cam portion 23 and a portion of this cable end is normally wrapped around the said spool-like cam portion 23, as is seen in FIG. 1, for example. The other end of the said operating cable 24 extends forwardly through openings provided therefor in the nose element 12, the tubular element 13 and the body element 11 for connection with an intermediate portion of a manually-operable and relatively elongated lever 25, through the attachment means, indicated at 26 in the aforementioned FIG. 1. The lever 25 is shown pivotally mounted, at 27, at one end thereof to one side wall surface of the body element 11 and it is made long enough to project outwardly through an elongated slot, indicated at 28 in FIG. 2, formed in the opposite side wall surface thereof.

Referring specifically to FIGS. 6 and 7, still another novel portion of the improved bridle mechanism 10 of the present invention constitutes the latch member, indicated generally at 30 which is shown in the overall view of FIG. 2, for example, as being mounted for pivotal movement, in a manner similar to that of the rear, pawl member 14, between a retracted position within, and in flush relation to the top of the open-framework assembly comprising the body element 11, and an upper, extended position in contacting and locking relation with a leading lip portion, indicated at 16b, of the pallet 16. The aforesaid retracted and extended positions of the latch member 30 are respectively depicted in phantom and solid lines. The above-mentioned pivotal movement of the latch member 30 is facilitated by its being assembled to a shaft at 31, which may be rotatably positioned in transverse relation within the body element 11 from one side thereof to the other, as is clearly depicted in FIG. 1. Again, for the purpose of receiving the shaft 31, the latch member 30 incorporates a pair of aligned openings, seen at 30d and 30e, respectively, in FIG. 7. As noted particularly in the latter figure, the shaft-receiving openings 30d and 30e have been incorporated in elongated, shaft-bearing portions formed on the respective spaced ends of a pair of straight, projecting arm elements, at 30b and 30c, which, in turn, are integrally formed on, and extend in parallel relation from a main, upper latch member-portion 30a that extends upwardly and at an angle to, or, in other words, in offset relation relative to the projecting arm elements 30d, 30e for releasably engaging with, and thereby constituting the actual locking element between the forward portion of the bridle mechanism 10 and a leading lip portion 16b on the pallet 16.

The foregoing latch member 30 may be manually pivoted between the previously-noted lower, retracted and upper, locking positions, against the action of a torsion spring, indicated at 32 in FIG. 2, for example, which torsion spring 32 is operative to normally retain said latch member 30 in its lowered, retracted position. This manual operation may be effected by means of a lanyard or relatively short rope or cable, indicated in broken-away and schematic form at 36, that may be suitably attached in an opening, at 39, to the said latch member 30. When not in use, the free end of said lanyard-rope or cable 36 may be releasably attached or tied to the load on the pallet 16.

When it is desired to use the improved pallet towing-bridle mechanism 10 of the present invention, for example, to tow the forwardmost cargo-pallet, as previously-indicated at 16 in FIG. 2, of a pallet-train, the next succeeding pallet thereof being indicated schematically and in phantom at 33, and when also a pallet, as at 34, is already on board, the inventive bridle mechanism 10, with both rear and front, pawl and latch members 14 and 30 in their retracted positions, may then be quickly and easily slid under the pallet 16, with the nose element 12 thereof being positioned a sufficient distance to the rear of the said pallet 16 to allow adequate room for the pivotal movement of the pawl member 14 which is to follow. Generally, this distance may be easily determined from the practice use of the present invention and, in particular, from the relative position, for example, of the front latch member 30 to the leading lip portion 16b of the pallet 16. It is noted that, with the improved compactness and configuration of the novel bridle mechanism 10, the body element 11 thereof may also be placed in the position shown in FIG. 2, for example, under the onboard pallet 34 with great facility.

After initially positioning the bridle mechanism 10 in the correct location between the pallets 16 and 34, and the aircraft cargo compartment-flooring 35, the rear, pawl member-operating lever 25 may then be manually actuated to its front position, or, in other words, to the left as viewed in FIG. 2, for example. This operation automatically actuates and pivots the cam mechanism 19, through the interconnecting operating cable 24, in a clockwise direction, as seen in the solid line position thereof in the aforementioned FIG. 2, so that the previously-described, projecting cam portions and/or spring-loaded operating arms thereof, as is indicated at 21b and 22b (FIG. 4), are thereby adjusted to their substantially vertically-downward position in contact with the flooring 35. This pivotal movement naturally results in the simultaneous raising of the rear end portion of the bridle mechanism 10, or in particular, the nose element 12 thereof, and in the rotation of the oppositely-disposed pair of projecting cam portions, at 21a and 22a, to their vertically upwardly-facing direction (FIG. 2), which, at the same time and thereby simultaneously urges and generally pivots the pawl member 14 and, in particular, the finger-shaped portion 14a thereof to the upper, solid line position. The entire bridle mechanism 10 may then be manually moved forward, or to the left as viewed in FIG. 2, for example, until the aforementioned finger shaped portion 14a of the pawl member 14 is firmly engaged with, and over the trailing lip portion 16a of the pallet 16, as is illustrated in the aforesaid FIG. 2.

After the above-described engagement between the pawl member 14 and the trailing lip portion 16a of the pallet 16 has occurred in the manner indicated hereinbefore, the forward or front end of the inventive bridle mechanism 10 may thereafter be manually lifted to a position in flush relation with the underside of the said pallet 16, and then, the latch member 30 pivoted, by the manual use of the lanyard-rope or cable 36, against the action of its spring 32, in an upward direction until its main, upper and offset pallet-engaging, latch member-portion 30a has been fully and resiliently engaged over the leading lip portion 16b of the pallet 16, against the action of the spring 32, as is illustrated in the solid line position thereof in FIG. 2. To specifically provide a positive hold between the latch member 30 and the pallet-leading lip portion 16b, a locking pin member 41 (FIG. 1) may be inserted in an opening 42 (FIG. 2) provided therefor in one side wall surface of the bridle mechanism-body element 11. Said locking pin member-opening 42 is designed to be positioned immediately below or underneath a squared-off portion 40a (Note particularly FIG. 6) forming an integral part of a tapered and/or expanding-type of front surface structure, indicated generally at 40 and which may be integrated with, or otherwise incorporated on one surface of one of the previously-described pair of projecting arm elements, 30b, 30c, of the latch member 30, as for example, the arm element 30b, as indicated in the aforementioned FIG. 6. In this regard, a stop element may also be provided at 43 (FIG. 2) for definitely limiting the lowered, retracted position of said latch member 30.

When both pawl and latch members 14 and 30 have been secured in locking engagement with the trailing and leading lip portions 16a and 16b, respectively, of the pallet 16, both the lanyard-rope or cable 36 and the lever 25 may be released. The latter action allows the spring-loaded, operating arms 21b and 22b (FIG. 4) on the cam mechanism 19 (FIG. 2) to automatically retract or, in other words, return to their phantom line position under action of the spring 29, thereby providing clearance between the underside of the inventive bridle mechanism 10 and the flooring 35. The cable hook of the standard cargo aircraft-winch mechanism may then be inserted through the opening 37 in the front end of the body element 11 and thereafter engaged around the pillar member 38.

As noted hereinbefore, the present arrangement ensures a line of pull during the towing of the pallet 16 by use of the improved bridle mechanism 10 that remains under the already-loaded pallet, as at 34, and therefore, the damage due to the usual "sawing" action of other systems has been eliminated. Moreover, the uniqueness and yet simplicity of the inventive bridle further enables the pallet to be towed to the desired 2 inch interval for thereby ensuring the maximum use of the available cargo space. When it is desired to release the bridle mechanism 10 from the pallet 16, it is only necessary to release the engagement between the latch member 30 and the leading, cargo pallet-lip portion 16b by the manual operation of the control lanyard-rope or cable 36 and thereafter allowing the disengagement of the finger-shaped portion 14a of the pawl member 14 from the trailing lip portion 16a. Naturally, the torsion springs 32 and 29 will automatically assist in the latter operation and thereby retract both latch, and pawl members 30 and 14 to their lower positions, with the bridle mechanism 10 simultaneously dropping to the aircraft cargo compartment-flooring 35. The aforesaid bridle mechanism 10, with the winch cable hook still attached, may then be pulled in an aft direction, by use of a suitable trailing line (not shown), to be attached to the next pallet, as at 33, to be towed.

I claim:

1. Aircraft cargo pallet towing-bridle means for ensuring the positioning of each of a series of loaded pallets within the cargo space of an aircraft at a predetermined minimum interval therebetween required for the complete loading of the aircraft, said bridle means comprising; a main, bridle-support insertable between the underside of the cargo pallet to be towed and the aircraft floor, and having a rear support element, a forward support element incorporating a front portion adapted to be releasably attached with the hook member of an aircraft towing-winch mechanism cable, and a relatively elongated, intermediately-disposed, support element rigidly interconnected between, and supporting said rear and front elements in opposed relation thereto; first, locking means mounted to said rear support element and adjustable between a first, inoperative position disposed between said cargo pallet and aircraft floor and a second, operative position oriented to the rear of, and in releasable engagement with, a trailing lip portion formed on said cargo pallet; second, locking means assembled to said forward support element to the rear of the front position thereof and at a predetermined interval forward of said first, locking means, said second, locking means being movable between a first, inoperative position beneath said cargo pallet and a second, operative position forward of, and in releasable engagement with, a leading lip portion formed on said cargo pallet; and separate operating means individually operably associated with, and respectively actuatable between oppositely-disposed positions to thereby adjust said first and second-named, locking means between their inoperative and operative positions in releasable engagement with the said trailing and leading lip portions of said cargo pallet.

2. Aircraft cargo pallet towing-bridle means as in claim 1, wherein said first, locking means comprises a pawl member.

3. Aircraft cargo pallet towing-bridle means as in claim 2, wherein said pawl member incorporates an outer, finger-shaped portion engageable with the said cargo pallet-trailing lip portion.

4. Aircraft cargo pallet towing-bridle means as in claim 2, wherein said rear support element comprises a substantially open-framework assembly incorporating a first, rotatable shaft for mounting, and adjusting said pawl member relative thereto between a lowered, retracted position substantially concealed within said framework assembly and an upper, extended position in the said releasable engagement with the cargo pallet-trailing lip portion.

5. Aircraft cargo pallet towing-bridle means as in claim 4, wherein said first, locking means further comprises a cam device interconnected with, and thereby rotatable by said separate operating means between inoperative, retracted and operative, extended positions, and having opposed projecting cam elements respectively oriented in contacting relation with the underside of said pawl member and the aircraft floor when being adjusted to its extended, operative position.

6. Aircraft cargo pallet towing-bridle means as in claim 5, wherein said separate operating means includes an operating cable attached to said cam device.

7. Aircraft cargo pallet towing-bridle means as in claim 6, wherein said separate operating means further includes a manually-controlled lever attached to one end of said operating cable.

8. Aircraft cargo pallet towing-bridle means as in claim 1, wherein said second, locking means comprises a latch member pivotally mounted to a second, rotatable shaft positioned in said front support element and adapted to ensure the pivotal movement of said latch member between a retracted, substantially concealed position, and a raised position in the said releasable engagement with the cargo pallet-leading lip portion.

9. Aircraft cargo pallet towing-bridle means as in claim 1, wherein said second, locking means comprises a latch member adjustable between said inoperative and operative positions; and a manually-releasable locking pin for positively retaining said latch member in its operative position in releasable engagement with said cargo pallet-leading lip portion.

10. Aircraft cargo pallet towing-bridle means as in claim 1, wherein each of said first and second-named, locking means incorporates a spring element normally retaining said locking means in their inoperative positions.

* * * * *